Nov. 18, 1924.  1,516,325

C. F. BOHNE ET AL

DIRIGIBLE HEADLIGHT

Filed March 8, 1923   2 Sheets-Sheet 1

Inventor
C. F. Bohne,
D. R. Bentz.

By A. Randolph Jr.
Attorney

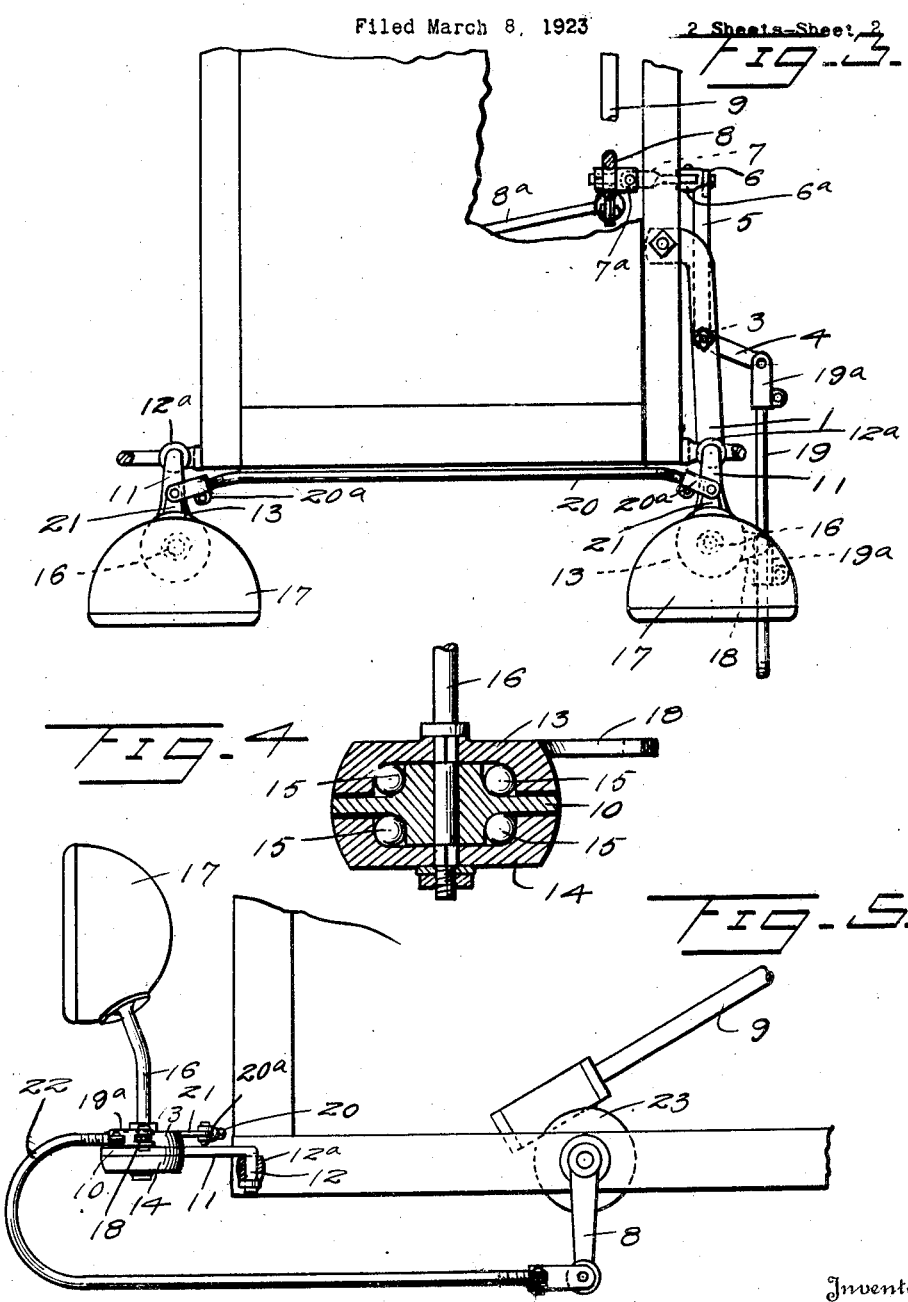

Patented Nov. 18, 1924.

1,516,325

UNITED STATES PATENT OFFICE.

CARL F. BOHNE AND DONALD R. BENTZ, OF NORFOLK, NEBRASKA.

DIRIGIBLE HEADLIGHT.

Application filed March 8, 1923. Serial No. 623,744.

*To all whom it may concern:*

Be it known that we, CARL F. BOHNE and DONALD R. BENTZ, citizens of the United States, residing at Norfolk, in the county of Madison and State of Nebraska, have invented certain new and useful Improvements in Dirigible Headlights; and we do hereby declare the following to be a full, clear, and exact description of the invention, such as will enable others skilled in the art to which it appertains to make and use the same.

This invention relates to adjustable headlights for motor vehicles and automobiles in particular, whereby the roadway ahead of the vehicle may be illuminated after dark whether the vehicle is traveling straight ahead or deviating from a straight course to the right or left.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Figure 1:
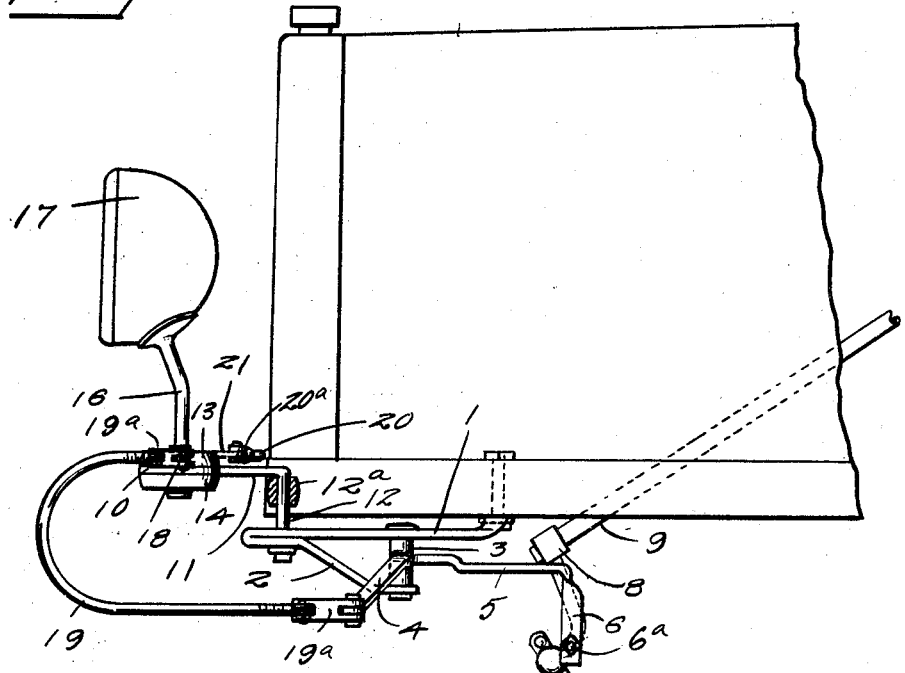
Figure 2:
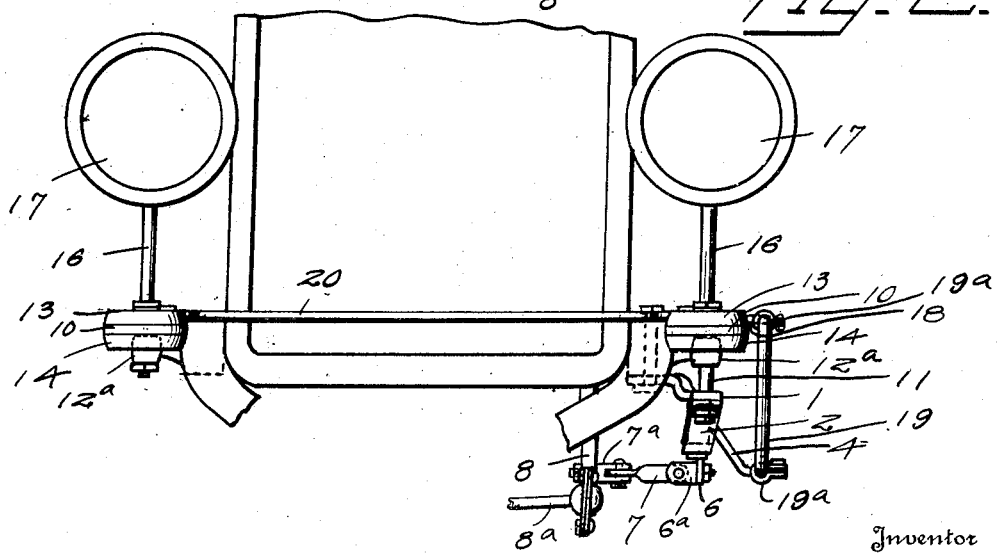

Referring to the accompanying drawings forming a part of the application,

Figure 1 is a side view of a portion of an automobile provided with a headlight and operating mechanism therefor embodying the invention, Figure 2 is a front view thereof, Figure 3 is a top plan view of the parts illustrated in the preceding views, Figure 4 is a sectional detail of the lamp supporting means, and Figure 5 is a detail view of a modification, certain connections between the steering gear and lamp being omitted.

Corresponding and like parts are referred to in the following description and designated in the several views of the drawings by like reference characters.

The numeral 1 designates an arm which is made fast at one end to the frame of the vehicle and extends laterally and forwardly thereof. A stay 2 is connected at its forward end to the front end of the arm 1 and extends rearwardly and downwardly. A port 3 is journaled between the rear end of the stay 2 and the arm 1 and has arms 4 and 5 extending therefrom, the arm 4 projecting outwardly and the arm 5 rearwardly, thence downwardly as indicated at 6. A lug 6ª at the lower end of the part 6 is connected by means of a link 7 with a lug 7ª secured to the steering arm 8 attached to the steering rod 9. A link 8ª connects the steering arm 8 with the rod, not shown, forming a tie between the arms of the steering knuckles in the well known manner.

A bearing 10 provided with a rearwardly extending arm 11 and a depending stud 12 at the rear end of the arm 11, is secured by means of the stud 12 to the fender brace or other bearing 12ª and to the front end of the arm 1 and stay 2. Cups 13 and 14 are arranged upon opposite sides of the bearing 10 and ball bearings 15 are interposed between the bearing 10, and cups 13 and 14 to reduce the friction to the smallest degree possible. A post or standard 16 passes through the bearings 10, and cups 13 and 14 and is journaled in the bearing 10 and secured to the cups 13 and 14 to turn therewith and serves as connecting means therefor. A lamp 17, such as commonly provided for use as a headlight, is secured to the upper end of the post or standard 16. An arm 18 projects laterally from the cup 13 and its outer end is connected to the curved end of a link 19 which is attached at its rear end to the outer end of the arm 4. In this manner, the headlight is connected with the steering gear of the vehicle so as to move therewith. A clevis 19ª threaded to the rear end of the link 19 adjustably connects the link to the arm 4.

The motor vehicle is provided with a pair of headlights which are disposed forwardly thereof and at the sides in order to meet general requirements. In accordance with the present invention, both lamps are similarly mounted so as to turn. A tie rod 20 pivotally connects arms 21 projecting rearwardly from the cups 13 of the lamp mountings whereby to cause both lamps to move in unison with the steering gear so that when the vehicle is traveling straight ahead both lamps will shed their rays of light in the direction of travel and when the vehicle is turned to the right or left, the lamps correspondingly turn so as to light up the roadway directly in the path of the vehicle and obviate a casualty such as frequently occurs by failure of the road ahead of the vehicle to be properly lighted when making a turn. A clevis 20ª threaded on each end of the tie road 20 adjustably connects the arms 21 thereto.

The foregoing discloses the invention in its application to an automobile of the Ford type, but in certain other types of automobiles such as indicated in Figure 5, certain pairs of the connections such as the arm 1, stay 2, post 3 with its arms 4 and 5, and the connections 6ª, 7 and 7ª may be dispensed with, the cup 13 being connected directly to the steering arm 8 by means of a link 22 similar in construction to the link 19. In this type of steering gear the arm 8 is connected to the steering rod 9 by means of the usual worm gearing 23, thereby making it possible to dispense with the connections herein enumerated when adapting the invention to a motor vehicle of the Ford type in which the arm 8 is attached directly to the steering rod 9.

What is claimed is:—

In a dirigible headlight, an arm attachable at one end to a vehicle, a stay extending from the other end of said arm downwardly and rearwardly, a post pivotally connected to said stay and to the arm above it, means extending from the post for connection to the steering mechanism of a vehicle, an arm extending outwardly from the post, a bearing, a lamp standard journaled in said bearing, said bearing having a rearwardly and downwardly extending arm passing through the first mentioned arm and stay, cups associated with said bearing, anti-friction members associated with the bearing and cups, said lamp standard being rigidly connected with said cups, an outwardly extending element on one of said cups, and a link pivotally connected to said outwardly extending member and to the second mentioned arm.

In testimony whereof we affix our signatures in presence of two witnesses.

CARL F. BOHNE.
DONALD R. BENTZ.

Witnesses:
A. H. FELGER,
C. W. WALSTROM.